United States Patent
Bardin et al.

(10) Patent No.: US 12,409,622 B2
(45) Date of Patent: Sep. 9, 2025

(54) INSERT FOR TIRE MOLD LINING ELEMENT

(71) Applicant: COMPAGNIE GENERALE DES ETABLISSEMENTS MICHELIN, Clermont-Ferrand (FR)

(72) Inventors: Damien Bardin, Clermont-Ferrand (FR); Jaroslaw Michno, Clermont-Ferrand (FR); Anna Majewska, Clermont-Ferrand (FR); Dariusz Konobrocki, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 326 days.

(21) Appl. No.: 17/628,806

(22) PCT Filed: Jul. 8, 2020

(86) PCT No.: PCT/FR2020/051215
§ 371 (c)(1),
(2) Date: Jan. 20, 2022

(87) PCT Pub. No.: WO2021/014066
PCT Pub. Date: Jan. 28, 2021

(65) Prior Publication Data
US 2022/0274362 A1    Sep. 1, 2022

(30) Foreign Application Priority Data

Jul. 24, 2019   (FR) .................................... 1908375

(51) Int. Cl.
*B29D 30/06*   (2006.01)
*B29C 33/00*   (2006.01)
(Continued)

(52) U.S. Cl.
CPC .......... *B29D 30/0606* (2013.01); *B29C 33/00* (2013.01); *B29D 30/08* (2013.01);
(Continued)

(58) Field of Classification Search
CPC ................ B29D 2030/0612; B29D 2030/0613
See application file for complete search history.

(56) References Cited

U.S. PATENT DOCUMENTS 2,587,297 A * 2/1952 Duerksen ........... B29D 30/0606
425/11
6,138,982 A * 10/2000 Bellot ..................... B29C 33/48
164/112
(Continued)

FOREIGN PATENT DOCUMENTS

CN        109803817 B  *  9/2021     ......... B29D 30/0606
EP           925907 B1  *  7/2003     ......... B29D 30/0606
(Continued)

OTHER PUBLICATIONS

International Search Report dated Oct. 1, 2020, in corresponding PCT/FR2020/051215 (4 pages).

*Primary Examiner* — Benjamin A Schiffman
(74) *Attorney, Agent, or Firm* — VENABLE LLP

(57) ABSTRACT

An insert (36) is designed to be incorporated in the composition of a fitting element (24) and to form part of the molding surface (40) of the fitting element, the molding surface comprising at least one intersection (32) of at least a first (42) and a second (44) projecting pattern. The insert comprises a junction (46) which is designed to be joined with a molding element (38) integral with the body (34) of the fitting element, the junction (46) dividing the second pattern (44) into a first (48) and a second (50) part, the insert (36) forming the first pattern (42) and the first part (48) of the second pattern (44), and the molding element (38)
(Continued)

forming the second part (50) of the second pattern (44), the junction (46) going away from the intersection (32).

11 Claims, 2 Drawing Sheets

(51) Int. Cl.
   *B29D 30/08* (2006.01)
   *B29C 33/38* (2006.01)
(52) U.S. Cl.
   CPC .. *B29C 33/3842* (2013.01); *B29D 2030/0612* (2013.01); *B29D 2030/0613* (2013.01)

(56) References Cited

U.S. PATENT DOCUMENTS

| | | | | |
|---|---|---|---|---|
| 6,193,492 | B1 * | 2/2001 | Lagnier | B29C 33/48 |
| | | | | 425/46 |
| 6,196,818 | B1 * | 3/2001 | Coleman | B29D 30/0606 |
| | | | | 425/46 |
| 8,323,013 | B2 * | 12/2012 | Jenkins | B29D 30/0606 |
| | | | | 29/469 |
| 8,506,275 | B2 * | 8/2013 | Villeneuve | B29C 33/10 |
| | | | | 425/46 |
| 9,308,699 | B2 * | 4/2016 | Gay | B29D 30/66 |
| 9,352,522 | B2 * | 5/2016 | Gueugneau | B29D 30/0629 |
| 9,561,631 | B2 * | 2/2017 | Villeneuve | B29D 30/72 |
| 9,987,811 | B2 * | 6/2018 | Gueugneau | B29D 30/0606 |
| 11,090,888 | B2 * | 8/2021 | Chigros | B29D 30/0606 |
| 11,345,103 | B2 | 5/2022 | Chigros et al. | |
| 11,925,976 | B2 * | 3/2024 | Tanguy | B22D 17/24 |
| 2018/0162016 | A1 | 6/2018 | Reeb et al. | |
| 2021/0070000 | A1 | 3/2021 | Chigros et al. | |
| 2023/0166468 | A1 | 6/2023 | Bardin et al. | |
| 2023/0347608 | A1 | 11/2023 | Bardin et al. | |
| 2023/0405952 | A1 * | 12/2023 | Popp | B29D 30/0606 |
| 2024/0059037 | A1 * | 2/2024 | Leblay | B29D 30/0606 |

FOREIGN PATENT DOCUMENTS

| | | | | |
|---|---|---|---|---|
| FR | 3022831 A1 * | 1/2016 | | B29D 30/0606 |
| WO | 2015/086974 A1 | 6/2015 | | |
| WO | 2019/122561 A1 | 6/2019 | | |

* cited by examiner

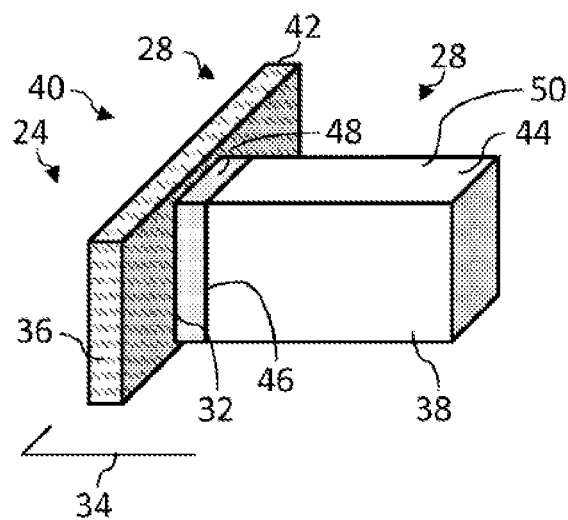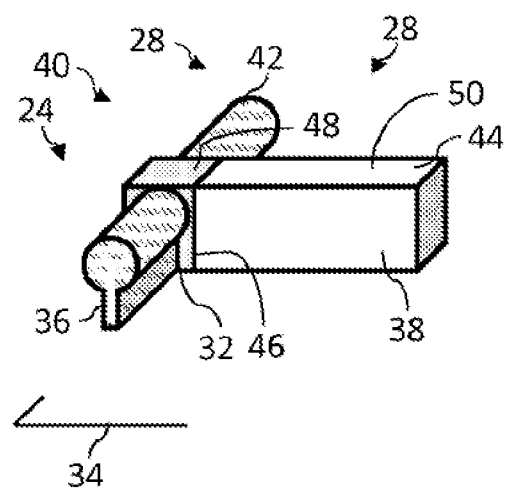
Fig. 4  Fig. 5
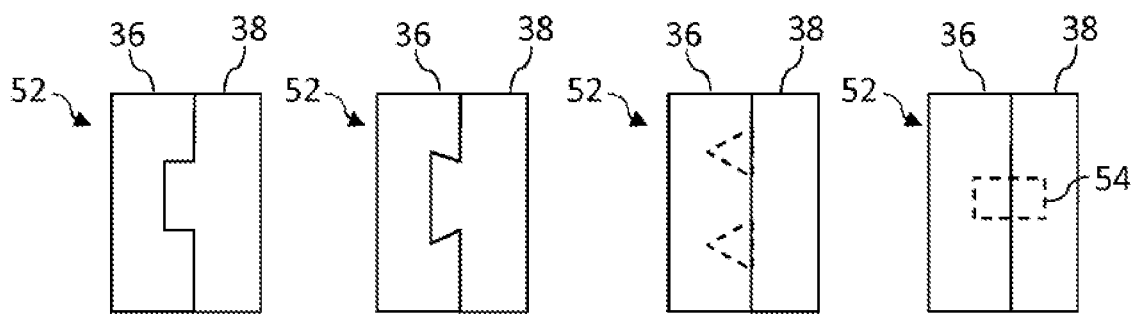
Fig. 6  Fig. 7  Fig. 8  Fig. 9

INSERT FOR TIRE MOLD LINING ELEMENT

BACKGROUND

The present invention relates to the production of tyres and, more particularly, to the field of curing moulds which are used in a step of curing a tyre.

Production of a tyre comprises a curing step, during which a tyre blank is moulded and vulcanised in order to provide the tyre with its mechanical characteristics, its geometry and its final appearance.

The tyre is generally cured in a curing mould for tyres. The mould forms an inner surface which is designed to form the outer surface of the tyre. In particular, the mould comprises a fitting which is designed to form all or part of the tread pattern of the tyre.

The fitting generally comprises a plurality of fitting elements which are arranged circumferentially. The fitting is supported by its radially outer surface on a ring of the mould. The radially inner surface of the fitting comprises recessed and projecting patterns. The projecting panels are generally formed by strips which are designed to form furrows on the tread pattern of the tyre.

In a known manner, the strips extend circumferentially and/or axially on the radially inner surface of the fitting, and intersect such as to form and delimit projecting, generally parallelepiped patterns on the tread pattern of the tyre.

The fitting elements are generally made of a material such as aluminium, and are obtained by a metal casting process.

It has been found that the projecting patterns comprising thin walls, or the patterns comprising complex forms are difficult to produce by means of a casting process. A casting process thus has the disadvantage of limiting the variety of the patterns forming the radially inner surface of the fitting.

In order to remedy this disadvantage, a process is known for production of a fitting element comprising inserts. The inserts are obtained according to a production process which makes it possible to obtain projecting patterns comprising thin walls, or complex forms, such as a machining process, an embossing process, or an additive production process. Then, the body of the fitting element is over-moulded around the base of the inserts.

As previously stated, the projecting patterns of the fitting can intersect. For example, a strip which is integral with the body of the fitting element can encounter an insert in the form of a sipe. Thus, the strip is also over-moulded against the insert. The strip and the insert thus meet along one or a plurality of contact surfaces extending on the outer surface of the insert.

However, the contact surface with a complex form between the strip and the insert can cause moulding defects of the strip, such as material which is not integral and weakens the retention of the insert by the strip, or flash which can cause moulding defects of the tyre.

Thus, it is necessary to provide on all or part of the strip an excess thickness of material with a thickness which is sufficient to prevent moulding defects, and thus improve the retention of the insert.

However, the excess thickness has the consequence of increasing the tread pattern of the tyre, or reducing the depth of the notch formed by the insert, thus detracting from the performance of the tyre such as the rolling resistance or service life.

Furthermore, the excess thickness of the strip forms a discontinuity between the furrows of the tread pattern of the tyre which can give rise to cracks, also detracting from the performance of the tyre.

Finally, the excess thickness makes it necessary to provide more material to produce the fitting or the tread pattern of the tyre.

SUMMARY

An objective of the invention is therefore to eliminate all of these disadvantages.

This objective is achieved by the invention, which proposes an insert designed to be incorporated in the composition of a fitting element, and to form part of the moulding surface of the said fitting element, the said moulding surface comprising at least one intersection of at least a first and a second projecting pattern, the insert being characterised in that it comprises a junction which is designed to be joined with a moulding element integral with the body of the fitting element, the junction dividing the second pattern into a first and a second part, the insert forming the first pattern and the first part of the second pattern, and the moulding element forming the second part of the second pattern, the junction going away from the intersection.

The junction makes it possible to space the contact surface between the insert and the element for moulding of the body of the fitting element, from the intersection with the complex form. This therefore dissociates the surface for moulding of the patterns from the material elements which form them, and moulding defects are prevented during the over-moulding of the moulding element against the junction. Moreover it is not necessary to provide an excess thickness in order to prevent moulding defects. Thus, use is made of the quantity of material which is strictly necessary for the formation of the projecting patterns. The junction makes it possible to obtain a fitting with good moulding quality. The quality of moulding of the body of the fitting element in the vicinity of the junction permits good retention of the insert.

Advantageously, the junction takes the form of an envelope of the surface of the intersection.

The envelope has a generally smooth and flattened form covering the intersection. Thus, the contact surface of the junction has a simplified form relative to that of the intersection. The form of the junction is selected such that the moulding element, over-moulded onto the surface of the junction of the insert, does not comprise thin parts or complex forms which are difficult to mould in the vicinity of the junction.

Preferably, the envelope is arranged relative to the surface of the intersection such as to minimise the volume of the first part of the second pattern.

Thus, the volume of material necessary for the production of the insert is minimised, and the production cost of the insert is reduced, in particular when the insert is produced by an additive production process.

Advantageously, the junction comprises means for retention of the insert relative to the moulding element.

According to a first variant, the means for retention of the insert comprise at least one recessed element which is designed to receive a projecting element of the moulding element. The recessed element takes the form of a groove or a cylindrical, spherical or polyhedral cavity.

According to a second variant, the means for retention comprise at least one recessed element and an added-on element which is accommodated in the said recessed element such as to form a protuberance on the surface of the junction, the protuberance being designed to be inserted in a recessed element of the moulding element.

Thus, the retention of the insert relative to the multi-element is improved. In addition, the recessed element makes it possible to minimise the volume of the first part of the second pattern.

According to a second objective, the invention proposes a fitting element which is designed to be added into a curing mould for tyres, characterised in that it comprises an insert according to a first objective of the invention.

According to a third objective, the invention proposes a process for production of an insert which is designed to be incorporated in the composition of a fitting element, wherein an insert according to the first objective of the invention is produced.

Preferably, the insert is produced by means of a process of selective consolidation by fusion.

According to a fourth objective, the invention proposes a process for production of a fitting element which is designed to be added into a curing mould for tyres, wherein:

an insert according to a process for production of an insert according to a third objective of the invention is produced;
the element for moulding of the body of the fitting element is joined to the junction of the insert.

Thus, the fitting element is obtained only partly by means of a process permitting the production of patterns comprising thin walls and complex forms, which makes it possible to reduce the production cost of the said element relative to a fitting element produced entirely by means of the said process. The moulding quality of the fitting element is improved, and any excess moulding thickness used by the prior art is superfluous.

According to a fifth objective, the invention proposes a curing mould for the tyres, characterised in that it comprises at least one fitting element according to the second objective of the invention.

According to a sixth objective, the invention proposes a process for production of tyres wherein a tyre is cured in a mould according to the fifth objective of the invention.

Finally, according to a seventh objective, the invention proposes a tyre which is designed to be fitted on the rim of a wheel, characterised in that it is obtained by a production process according to the sixth objective of the invention.

BRIEF DESCRIPTION OF THE DRAWINGS

The invention will be better understood thanks to the remainder of the description, which is based on the following figures:

FIG. 4 is a view in perspective of certain components of a curing mould for tyres according to the invention;

FIG. 5 is a view in perspective of certain components of the mould in FIG. 4;

FIG. 6 is a view from above of certain components of the mould in FIG. 4 according to a first variant of the retention means;

FIG. 7 is a view from above of certain components of the mould in FIG. 4 according to a first variant of the retention means;

FIG. 8 is a view from above of certain components of the mould in FIG. 4 according to a first variant of the retention means;

FIG. 9 is a view from above of certain components of the mould in FIG. 4 according to a second variant of the retention means.

DETAILED DESCRIPTION

In the various figures, elements that are identical or similar bear the same reference. Their description is therefore not systematically repeated.

Figure 1:
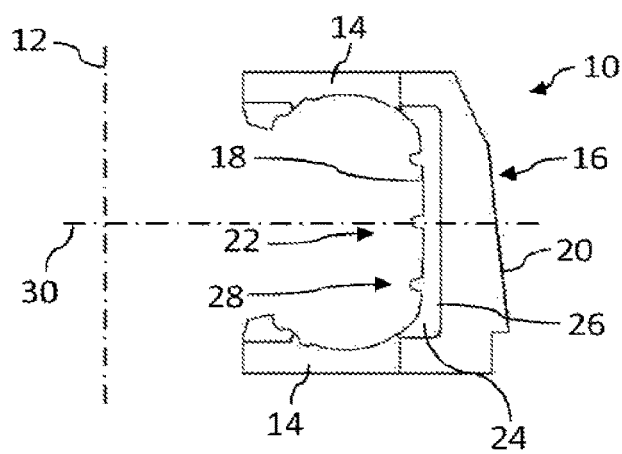
FIG. 1 is a view in radial cross-section of a curing mould for tyres.

FIG. 1 illustrates a mould 10 for the vulcanisation of tyres. The mould has a form of revolution by symmetry of the central axis 12, and in particular comprises two shells 14 and sectors 16. The two shells and the sectors are movable between a closure position, in which they form together an inner moulding surface, and an opening position, in which the two shells and the sectors are spaced such as to permit the introduction or extraction of a tyre (not represented).

The two shells 14 are movable axially and are designed to mould the sidewalls of a tyre. The sectors 16 are movable radially, and are designed firstly, in a position of closure of the mould, to mould all or part of the tread pattern of the tyre by means of a radially inner moulding surface 18, and secondly to cooperate with means for closure of the mould, by means of a radially outer surface 20, such as to form a firmly retained ring in a closure position of the mould.

The ring which is formed by the assembly of the sectors comprises a fitting 22. The fitting supports the radially inner moulding surface 18. The fitting is formed by a plurality of fitting elements 24. Each sector 16 comprises one or a plurality of fitting elements fitted removably in a receptacle 26 of the sector.

The radially inner moulding surface 18 of the fitting 22 comprises one or a plurality of patterns. "Pattern" means a form in relief, the function of which is technical and/or aesthetic. The patterns are recessed or projecting. By way of example, the projecting patterns 28 form strips or sipes, which are designed to form respectively furrows or notches on the tread pattern of the tyre. The strips extend circumferentially and/or axially on the moulding surface 18.

In all of the remainder of the text and unless otherwise indicated, an axial direction designates a direction parallel to the central axis 12, and a circumferential direction designates a direction perpendicular to a radial direction 30 of the mould and to the central axis.

Figure 2:
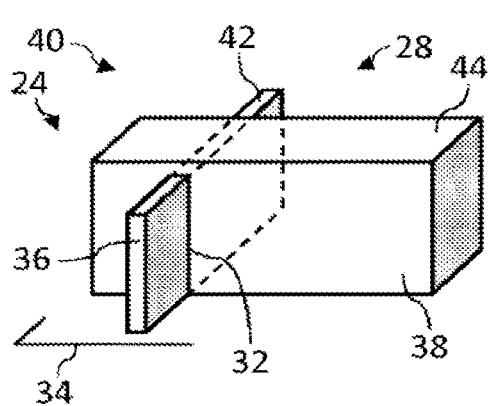
FIG. 2 is a view in perspective of certain components of a curing mould for tyres according to the prior art.

FIG. 2 illustrates the radially inner moulding surface of a mould comprising intersections 32 of projecting patterns. "Intersection" means the interface formed by the projecting patterns which intersect.

At least one fitting element 24 comprises a body 34 and at least one insert 36. By way of example, each fitting element comprises a plurality of inserts. The body of the fitting element comprises one or a plurality of moulding elements 38 which are integral with the body. The inserts and the moulding elements form the moulding surface of the fitting element 24.

The insert 36 forms all or part of one or a plurality of patterns comprising thin walls or complex forms. "Thin wall" means a part of a pattern with a protuberant form, with narrowing or a narrow strip, the thickness of which is less than 2.5 mm, and preferably less than 1.5 mm. "Complex form" means for example forms comprising undercuts, forms with continuous variations of cross-section, forms which follow the curvature of the circumferential or radial profile of the mould, forms with undulations, or combinations of these different forms.

The insert 36 can be obtained by any appropriate process, for example a machining process or a process of plastic deformation such as embossing.

Preferably, the insert is obtained by means of an additive production process which makes it possible to limit the consumption of material, contrary to a machining process. Even more preferably, the insert is produced by a process of selective consolidation by fusion, which makes it possible to obtain complex forms comprising undercuts, contrary to a process which uses a die or a mould.

"Additive production" means a process of production by addition of material.

"Selective consolidation by fusion" means an additive production process which is designed to aggregate or agglomerate incoming work material progressively and selectively such as to obtain an outgoing work material. The incoming work material takes the form of, and/or or forms part of, the composition of a powder, a wire, or a solution/bath. The incoming work material is generally introduced by depositing a powder on a support such as to form a layer. The support takes the form of a plate or a previously agglomerated layer. The agglomeration is generally obtained by solidification of the incoming work material which is fused totally or partly (sintering) by localised or generalised supply of energy, then cooled. The energy is generally supplied by means of a laser or an electron bundle, although it can be supplied by infrared radiation or induction. In the case of the laser and electron bundle, the localisation of the energy supplied is obtained by means for orientation of the energy supply, such as, respectively, optical or electromagnetic means. The process provides the incoming work material with a predetermined form and mechanical characteristics. The said form and the said characteristics depend on the material of the incoming work material and on parameters of the process. The said form is generally a solid in a single piece, although it can be constituted by a plurality of solids in single piece.

The body 34 of the fitting element is preferably obtained by means of a casting process comprising a step of moulding of the said body. A casting process permits production of large series of elements at a low cost. The body of the fitting element can also be obtained by means of any appropriate process, such as machining or additive production.

During the step of moulding of the body 34 of the fitting element, a molten material or a liquid material is poured into a fitting element mould (not represented). The inserts are incorporated in the composition of the fitting element mould. The body of the fitting element is over-moulded around the base of the inserts, then the fitting element mould, with the exception of the inserts, is destroyed in order to release the fitting element with the said inserts.

By way of example, the insert can also be assembled with the body of the fitting element obtained independently from the insert, by assembly means, such as screwed assembly means, means for assembly by welding, or also by coupling means such as a groove in the form of a dovetail provided in the body of the fitting element.

The insert 36 and the body 34 of the fitting element 24 are made of any material with mechanical properties, for example rigidity, suitable for the stresses encountered during use of the mould 10, and for the process implemented in order to obtain them. By way of example, the material of the fitting element is selected from amongst steel, aluminium and their alloys, or also a material based on resin. The material of the insert is selected from amongst steel and its alloys.

Figure 3:
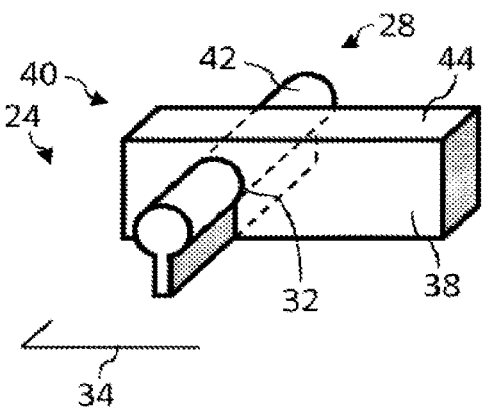
FIG. 3 is a view in perspective of certain components of the mould in FIG. 2.

FIG. 2 and FIG. 3 illustrate the intersection of two projecting patterns 28 on the moulding surface 40 of a fitting element 24 according to the prior art. The fitting element comprises a body 34 and an insert 36. The insert forms a first pattern. A moulding element 38, which is integral with the body of the fitting element, is over-moulded against the insert. The body of the fitting element forms a second pattern. The intersection 32 between the first pattern 42 and the second pattern 44 delimits the contact surface between the insert and the body of the insert.

FIG. 4 and FIG. 5 illustrate the intersection 32 of two patterns 28 on the moulding surface of a fitting element according to the invention. The insert 36 comprises a junction 46 which is designed to be joined with a moulding element 38 integral with the body 34 of the fitting element 24

The junction 46 divides the second pattern 44 into a first part 48 and a second part 50. The insert 36 forms the first pattern 42, and the first part 48 of the second pattern 44, and the moulding element 38 forms the second part 50 of the second pattern 44. The junction 46 goes away from the intersection 32.

Preferably, the moulding element 38 is over-moulded onto the junction 46. In this case, the form of the junction 46 is selected such that the moulding element 38, over-moulded onto the junction, does not comprise in the vicinity of the junction thin walls and complex forms which are difficult to mould.

Preferably, the junction 46 is in the form of an envelope of the surface of the intersection. "Envelope" means a surface which has a smooth form and is substantially flat covering the intersection, or in other words the flattened surface of the intersection 32.

The junction 46 is arranged relative to the surface of the intersection 32 such as to minimise the volume of the first part 48 of the second pattern 44.

Preferably, the junction 46 is tangent to the surface of the intersection 32, although the junction can also be distant in absolute terms from the intersection.

By way of example, the junction 46 has a flat form, substantially perpendicular to the longitudinal direction of the moulding element, or forming an angle contained in a range going from 0 to 20° with the said direction.

Preferably, the moulding element 38 comes directly into contact with the junction 46, in order to minimise the flash which can occur between the insert 36 and the said moulding element, during a step of curing of a tyre. The moulding element 38 can also be distant from the insert, such as to have an operating gap of 1 mm or less, and preferably 0.5 mm or less. Thus, the operating gap is filled when the mould is brought up to temperature by the differential expansion of the materials which constitute the insert 36 and the body 34 of the fitting element, and the internal stresses of the fitting element 24 are reduced.

The insert 36 comprises means 52 for retention of the insert relative to the moulding element. The retention means are arranged on the junction 46, and comprise at least one recessed element in which a protuberant element of the moulding element 38 is designed to be inserted.

Preferably, the projecting element is inserted in the recessed element by over-moulding.

According to a first variant illustrated in FIGS. 6, 7 and 8, the recessed element is arranged on the surface of the junction 46 of the insert such as to minimise the volume of the said insert. Conversely, the recessed element can be provided on the surface of the moulding element 38 which is designed to be joined with the junction 46, such as to facilitate the over-moulding of the body 36 of the fitting element onto the insert if applicable.

The recessed element can be in the form of a groove (FIG. 6) in which the moulding element of the body of the fitting element is designed to be over-moulded such as to form a strip. By way of example, the two opposite faces of the groove can be parallel, divergent (dovetail, FIG. 7) or convergent. The base of the groove has for example a curved or flat form.

The recessed element can also be in the form of one or a plurality of cavities (FIG. 8). The cavity has a closed, circular or polygonal contour, and extends such as to have a cylindrical, spherical or polyhedral, and in particular prismatic form.

According to a second variant illustrated in FIG. 9, the retention means comprise an added-on element 54 which is accommodated in the recessed element of the insert. The added-on element in the insert thus forms a protuberance on the surface of the junction. The moulding element is thus over-moulded around the protuberant added-on element.

Further variants and embodiments of the invention may be envisaged without departing from the scope of these claims.

The invention claimed is:

1. An insert configured to be incorporated in a composition of a fitting element and to form part of a molding surface of the fitting element,
   the molding surface comprising at least one intersection of at least a first and a second projecting pattern,
   the insert comprising a junction which is configured to be joined with a molding element integral with a body of the fitting element,
   the junction dividing a second pattern into a first and a second part,
   the insert forming a first pattern and the first part of the second pattern, and a molding element forming the second part of the second pattern,
   the junction having a flat form substantially perpendicular to a longitudinal direction of the molding element or forming an angle with the longitudinal direction of the molding element, the angle in a range going from 0° to 20°,
   the junction going away from the intersection, and
   the insert comprising at least one recessed element as means for retention of the insert, the at least one recessed element being arranged on the junction.

2. The insert according to claim 1, wherein the junction takes a form of an envelope of a surface of the intersection.

3. The insert according to claim 1, wherein the junction is arranged relative to a surface of the intersection such as to minimize a volume of the first part of the second pattern.

4. The insert according to claim 1, wherein the at least one recessed element takes a form of a groove.

5. The insert according to claim 1, wherein the at least one recessed element takes a form of a cylindrical, spherical or polyhedral cavity.

6. The insert according to claim 1, wherein the means for retention comprise the at least one recessed element and an added-on element which is accommodated in the at least one recessed element such as to form a protuberance on a surface of the junction, the protuberance being configured to be inserted in a recessed element of the molding element.

7. A fitting element which is configured to be added into a curing mold for tires, wherein the fitting element comprises the insert according to claim 1.

8. A curing mold for tires comprising at least one fitting element according to claim 7.

9. A process for production of tires comprising the step of:
   curing a tire in the curing mold according to claim 8.

10. A process for production of the insert according to claim 1 comprising the step of:
   producing the insert by means of a process of selective consolidation by fusion.

11. A process for production of a fitting element which is configured to be added into a curing mold for tires comprising the steps of:
   producing the insert according to the process of claim 10; and
   joining the molding element of the body of the fitting element to the junction of the insert.

\* \* \* \* \*